July 8, 1958        M. H. HEUBLEIN        2,842,217
POWER TAKE-OFF ATTACHMENT FOR AGRICULTURAL IMPLEMENT
Filed July 7, 1955        2 Sheets-Sheet 1
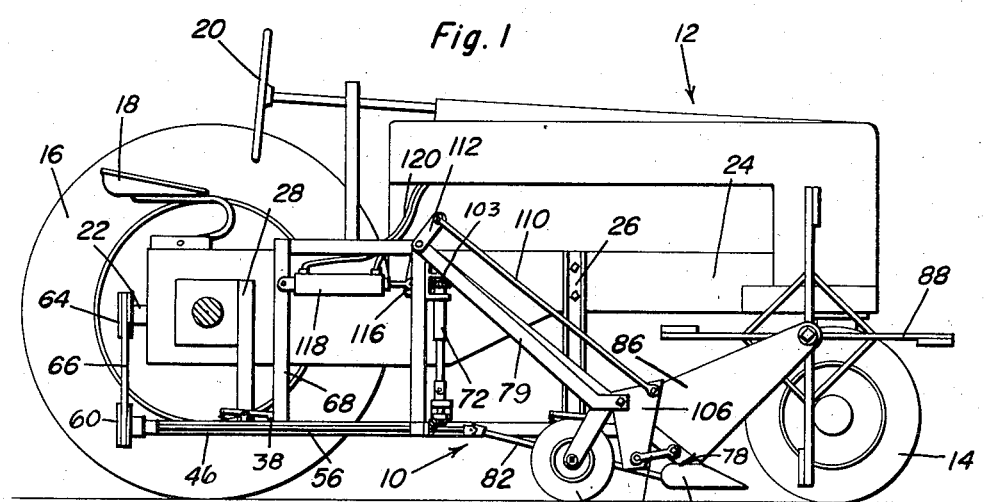
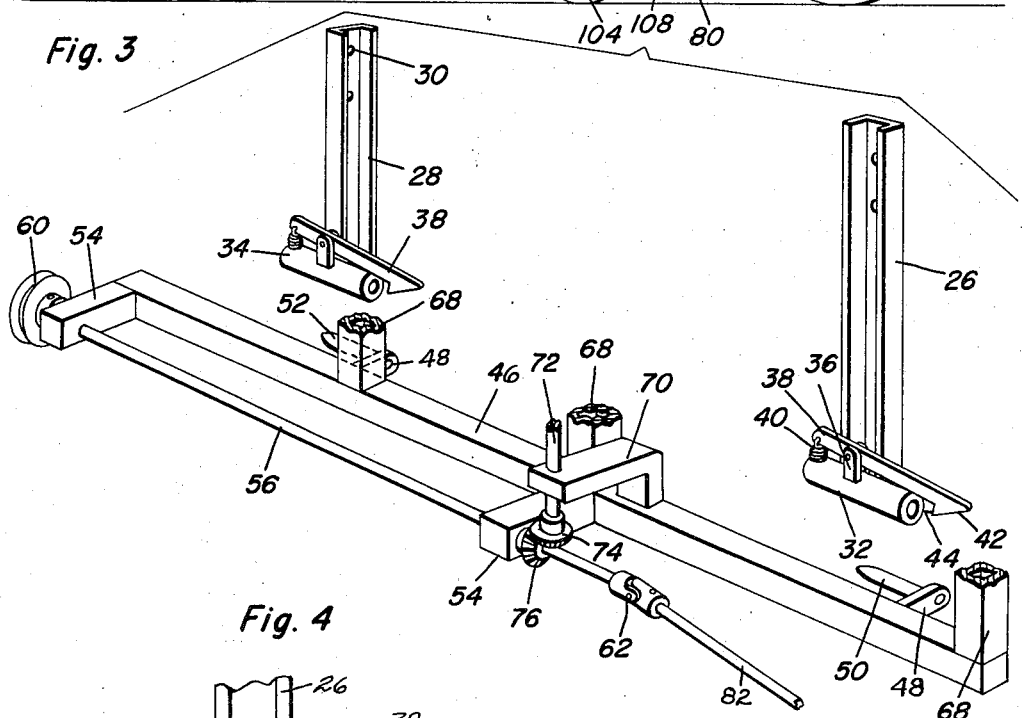
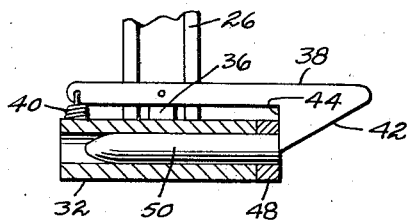
Morris H. Heublein
INVENTOR.
BY *Clarence A. O'Brien
and Harvey B. Jacobson*
Attorneys Morris H. Heublein
INVENTOR.

United States Patent Office 2,842,217
Patented July 8, 1958

2,842,217

POWER TAKE-OFF ATTACHMENT FOR AGRICULTURAL IMPLEMENT

Morris H. Heublein, Winona, Minn.

Application July 7, 1955, Serial No. 520,497

2 Claims. (Cl. 180—53)

This invention generally relates to a grain swather, and more specifically provides a novel means for attachment of a farm implement such as a grain swather alongside of a farm tractor for facilitating easy attachment and detachment of the implement.

An object of the present invention is to provide a grain swather adapted to be attached to a tractor and driven from a power take-off.

Another object of the present invention is to provide a grain swather having a pair of rearwardly extending rods thereon adapted to be slidably engaged with a pair of longitudinally aligned and spaced tubular sleeve-like brackets on the reactor together with latch means mounted on the brackets for retaining the rods in the brackets for detachably mounting the swather to the tractor for movement therewith, thereby facilitating the engagement and disengagement of the swather with the tractor.

Other important objects of the present invention reside in its simplicity of construction, ease of attachment, ease detachment, efficiency in operation, ease of control, adaptation for its various purposes and its relatively inexpensive manufacturing and maintenance cost.

These together with other objects and advantages which will become subsequently apparent reside in the details of construction and operation as more fully hereinafter described and claimed, reference being had to the accompanying drawings forming a part hereof, wherein like numerals refer to like parts throughout and in which:

Figure 1 is a side elevational view of the grain swather of the present invention attached to a tractor with a portion of the tractor being broken away with parts in section for illustrating the means of attachment thereto;

Figure 3 is an exploded group perspective view illustrating the mounting means for the grain swather of the present invention with parts being shown in section; and Figure 4 is an enlarged detailed sectional view taken through the center of one of the interengaging tubular brackets and rearwardly extending rods or pegs.

Figure 2:
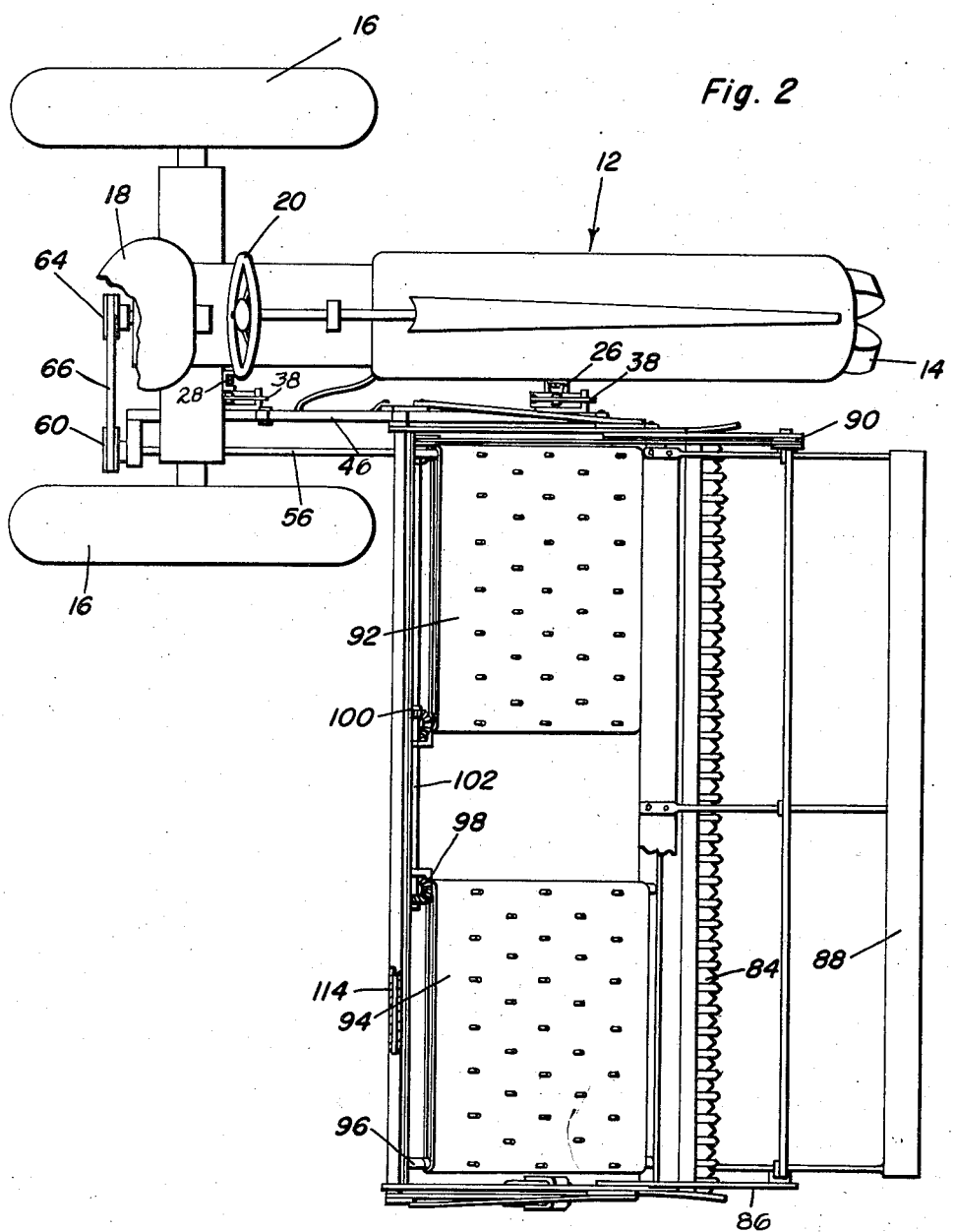
Figure 2 is a top plan view of the construction of Figure 1 with parts broken away and shown in section.

Referring now specifically to the drawings, the numeral 10 generally designates the grain swather of the present invention for attachment to a farm tractor generally designated by the numeral 12 wherein the tractor 12 includes front steerable wheels 14, rear driving wheels 16, an operator's seat 18, a control steering wheel 20, a power take-off 22 and frame 24, all of which represents conventional tractor construction which forms no part of the present invention except in its orientation to the various elements employed in the grain swather 10.

Secured to the frame 24 of the tractor 12 is a pair of downwardly extending channel members 26 and 28 each having apertures 30 in the web thereof for attachment to the frame 24 wherein the front channel member 26 faces outwardly and the rear channel member 28 faces forwardly. At the bottom of each of the channel members 26 and 28 is a tubular sleeve bracket 32 and 34 which are in longitudinal alignment and which are longitudinally spaced from each other. Upstanding from the center of each of the tubular sleeve brackets 32 and 34 is a pair of lugs 36 having an elongated latch member 38 pivoted thereto. A compression spring 40 interconnects the rear end of each of the tubular brackets 32 and 34 and the rear end of the latch members 38. The forward end of the latch member 38 is provided with an inclined cam surface 42 together with a recessed or hooked end 44 for a purpose described hereinafter wherein the spring 40 normally urges the hooked end 44 towards the brackets 32 and 34.

The grain swather 10 generally includes an elongated mounting bar 46 which extends parallel to the frame 24 of the tractor and is provided with longitudinally spaced and laterally extending bracket members 48 having rearwardly and longitudinally extending rods or pegs 50 and 52 mounted thereon respectively wherein the rods 50 and 52 are tapered at their ends for facilitating sliding engagement with the tubular sleeve brackets 32 and 34, respectively, substantially as illustrated in Figure 4. When the rod members 50 and 52 are slidably engaged with the brackets 32 and 34, the hooked end 44 of the latch 38 will engage the forward surface of the brackets 48, thereby locking the rods 50 and 52 in the brackets 32 and 34, respectively, thereby securely locking the mounting bar 48 and the grain swather 10 to the tractor 12 for movement and manipulation therewith.

The mounting bar 46 is provided with a pair of outwardly extending support bars 54 which journal an elongated drive rod 56 having a pulley 60 on the rear end thereof and a universal joint 62 on the forward end thereof. The pulley 60 is in alignment with a pulley 64 on the power take-off 22 of the tractor 12, and a V-belt 66 encircles the pulleys 60 and 64, thereby driving the drive rod or drive shaft 56.

Also provided on the mounting bar 46 is a plurality of vertically upstanding support members 68 for a purpose described hereinafter. Also, an offset supporting bracket 70 is provided for supporting a vertical drive shaft 72 that is provided with a gear 74 on its lower end in meshing engagement with a gear 76 on the drive shaft 56, thereby driving the vertical shaft 72.

Supported forwardly on an inclined pivotal frame 78 is a cutter bar 80 driven from a shaft 82 connected to the universal 62 wherein the cutter bar 80 is provided with a reciprocal cutter knife 84. A pair of projecting brackets 86 on the frame 78 rotatably support a swather reel 88 which is driven by a V-belt pulley 90. Also mounted on the frame 78 is a pair of conveyors 92 and 94 journalled on suitable end shafts 96 with the adjacent end shafts 96 provided with bevel gears 98 engaging bevel gears 100 on the laterally extending shaft 102 that is provided with a drive connection 103 to the vertical shaft 72 which is longitudinally adjustable. The outer end of a framework or carrier frame 79 is provided with a supporting wheel 104 that supports a mounting plate 106 which interconnects the supporting frame 78 and framework 79 wherein pivotal movement of the plate 106 will cause upward movement of the cutter bar 80 and the reel 88. The mounting plate 106 is pivotally connected to the framework 79 adjacent one corner thereof, and a link 108 interconnects the plate 106 and the frame 78 adjacent the other corner thereof, and an elongated connecting bar 110 connects the plate 106 at another corner thereof to an offset link 112 connected to a transverse bar 114 that is provided with an offset oppositely extending link 116 at its inner end that is connected to one end of a hydraulically actuated piston and cylinder arrangement 118 that is supported on the rear upstanding member 68 wherein contraction and expansion of the hydraulic cylinder and piston will cause upward and downward movement of the cutter bar 80 and the reel 88 thereby effectively raising and lowering the cutter bar 80 as well as the frame 78 with the conveyors mounted thereon. The hydraulic piston and cylinder arrangement 118 is supplied from the usual hydraulic pump by flexible conduits 120, and any suitable lubrication fittings and bearings are provided, where necessary.

The grain swather 10 of the present invention provides a device which will be easily controlled and which will windrow the cut grain in spaced relation to the path of movement of the tractor and the attachment means permits the device to be attached to the tractor 12 without any manipulation by the operator of the tractor except the driving manipulation of the tractor. With the grain swather 10 positioned in a stationary position, the operator of the tractor 12 may maneuver the tractor for alignment of the brackets 32 and 34 with the rods 50 and 52, whereupon forward movement of the tractor 12 will then cause automatic locking engagement between the rods 50 and 52 and the brackets 32 and 34 and the latch member 38 will releasably lock the grain swather 10 to the tractor 12 for manipulation thereby.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention as claimed.

What is claimed as new is as follows:

1. In combination, a farm tractor having a frame extending longitudinally and a power take-off, a farm implement having a powered working element drivingly connected with the power take-off, a pair of depending members rigidly supported on said frame in longitudinally spaced relation, a horizontally disposed sleeve bracket on the lower end of each depending member, said sleeve brackets being disposed in longitudinal alignment, a longitudinal mounting bar on the implement and being disposed alongside the tractor, a pair of laterally extending bracket members on said mounting bar, a rearwardly extending pin at the outer end of each bracket member, said pins being disposed in longitudinal spaced alignment corresponding to the longitudinal spacing of the sleeve brackets for sliding engagement with the sleeve brackets, and pivotal latch means supported on at least one of said sleeve brackets for engagement with the front of the adjacent bracket member thereby precluding withdrawal of the pins from the sleeve brackets thus detachably connecting the mounting bar of the implement to the tractor, said implement having a ground engaging support wheel thereon on the side thereof remote from said bar with the connection permitting relative pivotal movement between the tractor and implement, said means including a longitudinally extending latch member pivotally mounted on said sleeve bracket, a hook-shaped forward end on said latch member for projecting forwardly of the top edge of the bracket member, said forward end having a vertical surface for engaging the front surface of the bracket member when the pin is disposed in the sleeve bracket with the rear surface of the bracket member engaging the front end of the sleeve bracket, said hook-shaped end of the latch member being provided with a forwardly and upwardly inclined lower edge forming a cam surface, said cam surface causing the forward end of the latch member to ride up and over the upper edge of said bracket member when the sleeve brackets are in alignment with and behind the pins and the tractor is moved forwardly and the vertical surface of the latch will engage the front surface of the bracket member when the pin is completely received in the sleeve bracket.

2. The combination of claim 1 wherein the driving connection between said power take-off and said working implement comprises a longitudinally extending power shaft journaled on said mounting bar, said shaft being driven from the power take-off on the tractor and connected with the working element of the farm implement.

References Cited in the file of this patent

UNITED STATES PATENTS

| | | |
|---|---|---|
| 786,585 | Moran et al. | Apr. 4, 1905 |
| 1,464,740 | Benjamin et al. | Aug. 14, 1923 |
| 2,582,108 | Dean | Jan. 8, 1952 |
| 2,636,568 | Rutishauser | Apr. 28, 1953 |
| 2,674,082 | Ryden | Apr. 6, 1954 |
| 2,729,468 | Hauswirth et al. | Jan. 3, 1956 |
| 2,749,995 | Klemm et al. | June 12, 1956 |

FOREIGN PATENTS

| | | |
|---|---|---|
| 1,066,294 | France | Jan. 20, 1954 |